US 9,299,066 B2

(12) United States Patent
Borghetti et al.

(10) Patent No.: US 9,299,066 B2
(45) Date of Patent: Mar. 29, 2016

(54) FORWARDING MESSAGES FOR MEETING ATTENDEES TO HOST COMPUTERS AT THE MEETING LOCATION

(71) Applicant: International Business Machines Corporation, Armonk, NY (US)

(72) Inventors: Stefano Borghetti, Rome (IT); Umberto Caselli, Rome (IT); Gianluca Della Corte, Rome (IT); Alberto L. Galvani, Aprilia (IT); Leonardo Lanni, Rome (IT); Antonio M. Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 13/648,391

(22) Filed: Oct. 10, 2012

(65) Prior Publication Data
US 2014/0101268 A1    Apr. 10, 2014

(51) Int. Cl.
*G06F 15/16*   (2006.01)
*G06Q 10/10*   (2012.01)

(52) U.S. Cl.
CPC .................. *G06Q 10/1093* (2013.01)

(58) Field of Classification Search
USPC .................... 709/709, 206, 204, 200, 223
See application file for complete search history.

(56) References Cited

U.S. PATENT DOCUMENTS

| | | | |
|---|---|---|---|
| 7,428,580 B2 | 9/2008 | Hullfish et al. | |
| 7,916,853 B2 | 3/2011 | Daniell et al. | |
| 2004/0078445 A1 | 4/2004 | Malik | |
| 2007/0029380 A1* | 2/2007 | Keohane et al. | 235/382 |
| 2008/0318561 A1 | 12/2008 | Olshansky et al. | |
| 2010/0037151 A1* | 2/2010 | Ackerman et al. | 715/753 |
| 2010/0179995 A1 | 7/2010 | Wang et al. | |
| 2012/0054288 A1* | 3/2012 | Wiese et al. | 709/206 |

* cited by examiner

*Primary Examiner* — El Hadji Sall
(74) *Attorney, Agent, or Firm* — Yee & Associates, P.C.; Joseph Petrokaitis (57) ABSTRACT

A method and apparatus for managing messages is disclosed. A data processing system identifies a presence of a person in a meeting at a location using calendar information. The data processing system also identifies a computing device in the location having a connection to a network. The data processing system then sends a notification to the computing device identified in the location, responsive to the data processing system identifying a message for the person when the person is meeting in the location.

18 Claims, 8 Drawing Sheets

FORWARDING MESSAGES FOR MEETING ATTENDEES TO HOST COMPUTERS AT THE MEETING LOCATION

BACKGROUND

1. Field

The disclosure relates generally to data processing systems and in particular, to managing messages sent to data processing systems. Still more particularly, the present disclosure relates to a method, apparatus, and computer program for routing messages for a person attending a meeting to a computing device at the meeting.

2. Description of the Related Art

Computer users use collaboration tools to exchange messages with other computer users. Typical collaboration tools include tools for chatting, texting, instant messaging, multimedia messaging, sending email, and for exchanging voice communications and conducting video conferences over a network. The collaboration tools operate with the presence of a user. The presence of a user is typically determined by the collaboration tools running in a workstation assigned to a user. For example, when the user is logged into a workstation where collaboration tools are running, the collaboration tools may use the information that the user is logged into the workstation to identify the user as available to receive messages.

If a user is not present, the other users will not be able to immediately communicate with the user. Instead, any messages for the user would have to be recorded for later retrieval. However, some messages are urgent and require immediate attention.

When a computer user leaves his or her workstation to attend a meeting, the user will typically log out of the workstation, which in turn identifies the user as not being present at the workstation. Because of the importance of some messages, it would be advantageous if there was a way to use the information about the meeting the user is attending in a process for routing important messages to a user while the user is at the meeting.

Some collaboration tools also run on portable communications devices. Portable communication devices running collaboration tools allow a user to receive messages while the user is away from his or her workstation. However, some users do not have portable communication devices. Also, some collaboration tools are not available on some portable communications devices and some locations do not allow portable communications devices. Further, some portable communications devices may not be fully functional at the location where a meeting is being held. For example, government facilities, corporate offices, and other secure locations may block wireless signals where a meeting is being held. Still further, even if the user does have a portable communications device with the correct collaboration tools, there may be benefits to using collaboration tools on a computer workstation, such as performance, monetary, and logistical benefits associated with the meeting.

Therefore, it would be advantageous to have a method, apparatus, and computer program product that takes into account at least some of the issues discussed above, as well as possibly other issues.

SUMMARY

In one illustrative embodiment, a method, apparatus, and computer program product for managing messages is provided. An apparatus identifies a presence of a person in a meeting at a location using calendar information. The apparatus also identifies a computing device in the location having a connection to a network. The apparatus then sends a notification to the computing device identified in the location, responsive to the apparatus identifying a message for the person when the person is meeting in the location.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account that existing collaboration tools are available for facilitating communications between computer users such as for chatting, texting, instant messaging, multimedia messaging, email, and for voice and video communications over networks. Existing collaboration tools also determine the presence of a user. For example, when the user is using a collaboration tool, the collaboration tool identifies the user as present.

The illustrative embodiments also recognize and take into account that existing calendaring tools are available for scheduling meetings for a group of people. Calendaring tools also create and send meeting invitations to the group of people invited to attend scheduled meetings. Calendaring tools further receive and record status as to whether people agree to attend schedule meetings. For example, some calendaring tools send meeting invitations and receive responses to meeting invitations via email. As another example, other calendaring tool computer users login to the calendaring tool to create, send, and accept invitations.

Thus, the different illustrative embodiments provide a method, apparatus, and computer program product to manage messages. Particularly, the different illustrative embodiments may use a process for sending notifications associated with messages for a person in a meeting to a computing device located in a location of the meeting. For example, a message management system may identify a presence of a person in a meeting at a location using calendar information. The message management system may also identify a computing device in the location having a connection to a network. The message management system may then send a notification to the computing device identified in the location, responsive to the data processing system identifying a message for the person when the person is meeting in the location. For example, the message management system may send a notification to the computing device identified in the location that indicates the message is present for the person attending the meeting.

As used herein, the term "computing device" means a hardware device with a processor unit and a capability to display information on a display device and may also include the capability to emit audio on a speaker. For example, the computing device may be a computer, a television with a processor unit, and any other suitable device.

Figure 1:
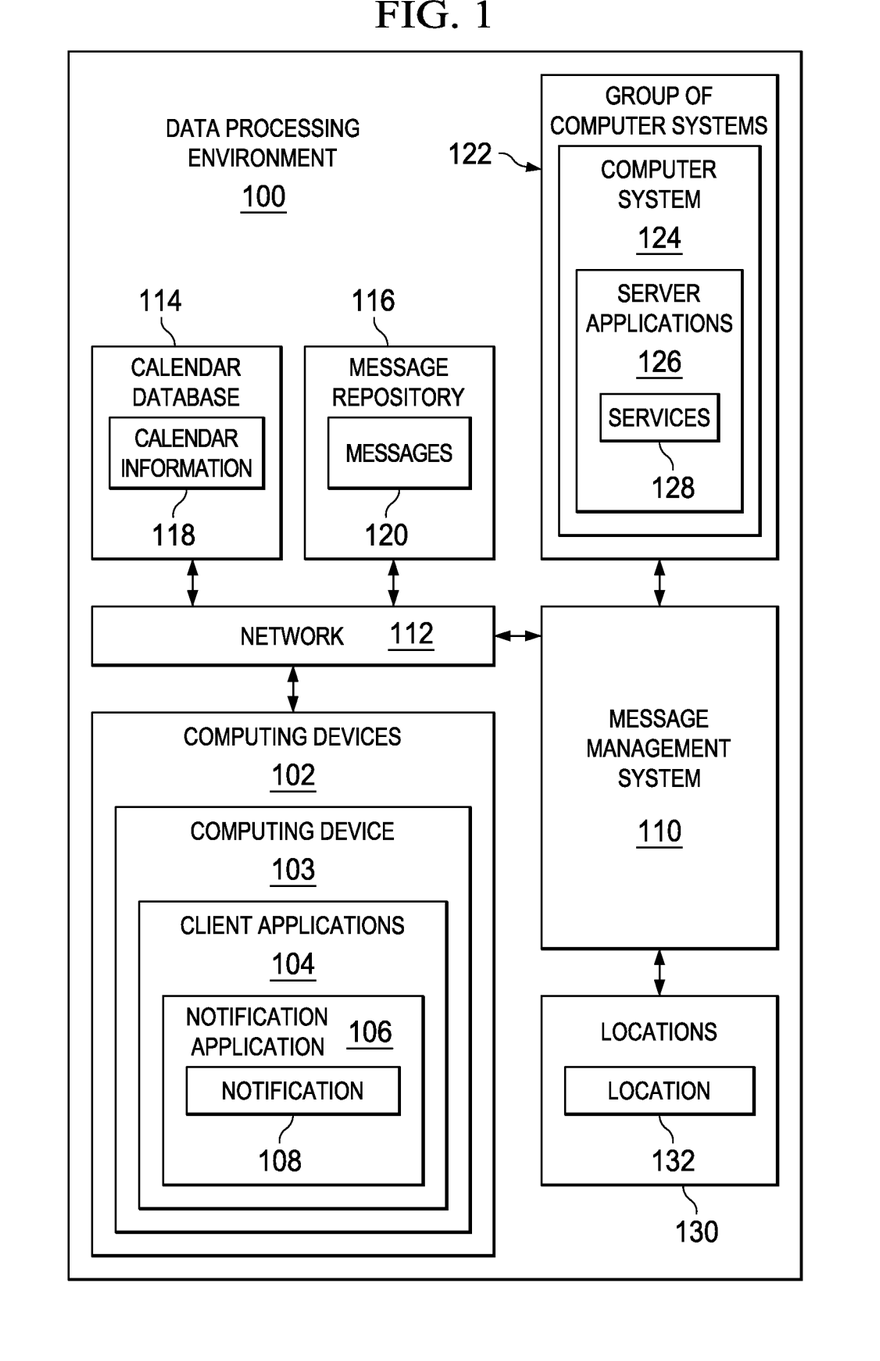
FIG. 1 is an illustration of a data processing environment for managing messages in accordance with an illustrative embodiment.

With reference now to the figures and, in particular, with reference to FIG. 1, an illustration of a data processing environment for managing messages is depicted in accordance with an illustrative embodiment. In this illustrative example, data processing environment 100 is depicted in block diagram form.

Client applications 104 run on computing devices 102, such as computing device 103, within data processing environment 100. Client applications 104 may take various forms. For example, client applications 104 may be at least one of notification application 106, a web browser, a database application, a smart-phone application, and/or other suitable types of applications.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In other examples, "at least one of" may be, for example, without limitation, two of item A, one of item B, and 10 of item C; four of item B and seven of item C; and other suitable combinations.

As depicted, client applications 104, such as notification application 106 present notification 108 to users of computing devices 102. In these illustrative examples notification 108 may be displayed in notification application 106 in a process managing messages using message management system 110. As depicted, client applications 104 in computing devices 102 may communicate with message management system 110 over network 112. As also depicted, message management system 110 and client applications 104 in computing devices 102 may communicate with calendar database 114 and message repository 116 over network 112.

In these illustrative examples, calendar database 114 provides access to calendaring information. This information may include, for example, meetings that have been scheduled. As depicted, calendar database 114 includes calendar information 118. In these illustrative examples, calendar information 118 comprises data about meetings between computer users. For example, calendar database 114 may provide services to search for and retrieve data about meetings in calendar information 118. This data may include, for example, dates and times of meetings as well as persons who will be present in the meetings.

As depicted, message repository 116 provides access to messages 120. In these illustrative examples, message repository 116 may provide a service to search for and retrieve messages 120. For example, in a process managing messages, notification application 106 may communicate with message management system 110 and message repository 116 to identify and display notifications, such as notification 108. In this example, notification 108 may be for a computer user present in a meeting identified in calendar information 118. More particularly, in this example, notification 108 may be in response to a message received at message repository 116 when the computer user is present in the meeting as identified by message management system 110. For example, responsive to a message being received at message repository 116 when a computer user is present in a meeting, message management system 110 may subsequently generate and send notification 108 to notification application 106. In this example, notification application 106 displays notification 108 when received.

In these illustrative examples, computer system 124 within group of computer systems 122 is one or more computers. Also, as used herein, "group of" when used with reference to items means one or more items. For example, group of computer systems 1222 is one or more computer systems. When computer system 124 is more than one computer, the computer system may take the form of a computer cluster, group of computer systems 122, or other configurations of computer systems configured to run server applications 126.

Message management system 110 uses sever applications 126 located on computer system 124 in group of computer systems 122. A computer system is one or more computers in these illustrative examples. Server applications 126 may be any applications configured to process communications to provide services 128. Server applications 126 may be, for example, at least one of a database server, a file transfer protocol (FTP) server, a web server, a mail server, and/or other suitable types of applications. Services 128 may include, for example, at least one of retrieving a file, retrieving a webpage, retrieving information, writing information, downloading a program, and/or other suitable types of access.

Message management system 110 may be implemented using hardware, software, or a combination of the two. In these illustrative examples, message management system 110 is configured to manage messages using group of computer systems 122. Communications sent by client applications 104 in computing devices 102 are processed by message management system 110. In these illustrative examples, message management system 110 is configured to use services 128 of server applications 126. For example, message management system 110 may use a service in services 128 to search calendar database 114 to find meetings in calendar information 118. As another example, message management system 110 may use another service in services 128 to search message repository 116 for messages in messages 120 for a computer user present in a meeting in calendar information 118.

In these illustrative examples, notifications, such as notification 108, are routed to computing devices 102 based on locations 130 of computing devices 102. For example, in a process routing messages, message management system 110 may identify location 132 as matching a location where computing device 130 is located and a location of a meeting in calendar information 118 in which a user is present. In this example, responsive to location 132 matching the location of computing device 103 and the location of the meeting in calendar information 118, message management system 110 routes notifications for the user to notification application 106.

The illustration of data processing environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional message management systems, in addition to message management system 110, may be present within data processing environment 100. Also, although message management system 110 is shown as a block separate from group of computer systems 122, message management system 110 may be implemented in computer system 124. In still other examples, message management system 110 may be implemented in one or more computer systems in group of computer systems 122.

Figure 2:
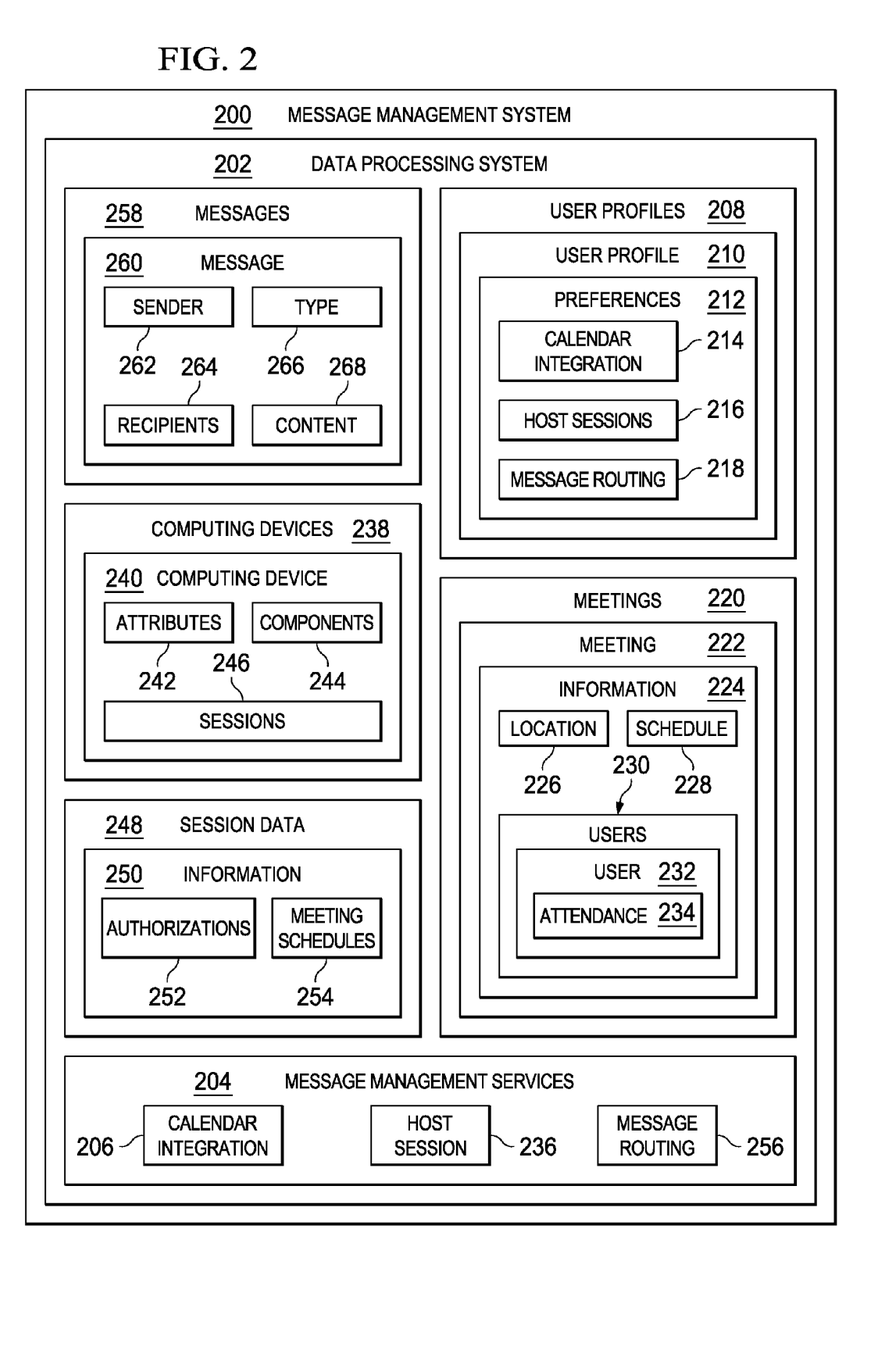
FIG. 2 is a block diagram of components involved in managing messages in a data processing system in a message management system in accordance with an illustrative embodiment.

Turning next to FIG. 2, a block diagram of components involved in managing messages in a data processing system in a message management system is depicted in accordance with an illustrative embodiment. Message management system 200 is an example of one implementation of message management system 110 in data processing environment 100 in FIG. 1.

In this illustrative example, data processing system 202 is present in message management system 200. Data processing system 202 may be any combination of hardware components implementing message management system 200. Data processing system 202 comprises message management services 204. In these illustrative examples, message management services 204 comprise a number of services that manage messages. Calendar integration 206 is a service included in message management services 204 that identifies and processes calendar information in message management system 200. For example, calendar integration 206 may access calendar database 114 in FIG. 1 using network 112 in FIG. 1. In this example, calendar integration 206 may use calendar database 114 to search for and retrieve data about meetings in calendar information 118 in FIG. 1.

As depicted, user profiles 208 include one or more profiles in message management system 200 of users of message management system 200. In these illustrative examples, user profile 210 is an example of a one or more user profiles located in user profiles 208. Each user profile in user profiles 208 is an account or other record of information about a user of message management system 200. In these illustrated examples, user profiles, such as user profile 210, include preferences 212 of users of message management system 200. Preferences 212 of users may be selected by a user, an administrator, and by a rule using default preferences.

In particular, preferences 212 include preferences for at least one of calendar integration 214, host sessions 216, message routing 218, and other suitable types of preferences. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

In the illustrative examples, calendar integration 214 preferences of user profile 210 include an identification of one or more calendar services for the user. These calendar services for the user may, for example, be provided by calendar databases and calendar servers. Calendar integration 214 preferences also include an identification of networking information for making networking connections over networks to the calendars services. The networking information for making networking connections may, for example, include networking protocols, networking addresses, and any other suitable networking information in message management system 200. As depicted, calendar integration 214 preferences further include login information used by the calendar services, such as user identification information and passwords. In these illustrative examples, calendar integration 214 preferences may also include any other suitable information for use in integrating calendars services into message management system 200. For example, calendar integration 214 preferences may also include preferences for processing changes to calendar information 118 by services in message management services 204 when information about the meetings in calendar information 118 is created, updated, and deleted in calendar database 114.

As depicted, preferences in host sessions 216 in preferences 212 of user profile 210 include rules selecting a computing device based on one or more attributes of computing devices and one or more components in computing devices. For example, preferences in host sessions 216 may include a preference for a type of display device and another preference for a type of collaboration tool in computing devices for a process for routing messages to sessions in computing devices in message management system 200. Preferences in host sessions 216 also include login information for logging into a session in computing devices. This login information may include, for example, user identification information and passwords.

In these illustrative examples, message routing 218 preferences of user profile 210 include rules that filter messages and rules that route messages in message management system 200. For example, message routing 218 preferences may include rules that filter messages not meeting a selected level of a threshold for message severity. In this example, the level of severity of a message may be determined by content in the message. Further in this example, the level of severity of the message may also be determined by who the sender is and by who the recipients are in the message. In this example, the level of severity of the message may be higher when a message is sent from a manager and when a manger is one of the recipients of the message. Message routing 218 preferences of user profile 210 may also include login information for logging into message repositories, such as message repository 116 in FIG. 1.

In these illustrative examples, meetings 220 in message management system 200 is an example of meetings in calendar information 118 in FIG. 1. As depicted, information 224 in each meeting in meetings 222, such as meeting 222, is calendaring information for each meeting. In these illustrative examples, information 224 in meeting 222 includes location 226 for meeting 222, schedule 228 for meeting 222, and users 230 in meeting 222. As depicted, information 224 in meeting 222 also includes information about attendance 234 of each user in users 230 in meeting 222. User 232 is an example of a user in users 230 in meeting 222.

As depicted, location 226 in meeting 222 may comprise a physical address, a name or number of a room, and any other suitable information for identifying the place where meeting 222 is located. Schedule 228 for meeting 222 may comprise one or more dates, times, and durations of meeting 222. Schedule 228 in meeting 222 may also comprise one or more portions of meeting 222 and identify when users 232 will be present in meeting 222 in each of the one or more portions. In these illustrative examples, users 230 may be determined by message management services 204 as present in meeting 222 when the meeting is scheduled to occur according to schedule 228. When an indication is present in attendance 234 indicating that user 232 will attend meeting 222, the indication identifies user 232 as present in location 226 in meeting 222.

In these illustrative examples, attendance 234 may be a user selected preference for attending meeting 222. For example, attendance 234 may be identified based on user 232 logging into computing device 240 at location 226. Attendance 234 may also be a physical presence of user 232 identified by computing device 240 at location 226. For example, attendance 234 may be identified based on a radio frequency identification tag of user 232, a global positioning device of user 232, and any other suitable means that identifies attendance 234 of user 232. As still another example, attendance 234 may be identified based on an absence of user 232 at another location other than location 226.

Host session 236 is a service in message management services 204. Host session 236 is configured to manage computing devices 238 in message management system 200. In these illustrative examples, computing devices 238 in message management system 200 include one or more computing devices such as computing device 240. As depicted, computing device 240 is a component of message management system 200 in a process managing messages in message management system 200. For example, computing device 240 may be a client computer in computing devices 102 in FIG. 1. As another example, computing device 240 may be a server in group of computer systems 122 in FIG. 1, such as computer system 124 in FIG. 1. As still another example, computing device 240 may be any combination of hardware components and/or software components suitable that provide a notification to a user in message management system 200.

As depicted, computing device 240 comprises attributes 242, components 244, and sessions 246. In these illustrative examples, attributes 242 of computing device 240 may describe configuration of computing device 240 associated with receiving messages for a person attending a meeting. For example, attributes 242 may include configuration information of components 244 and configuration information of sessions 246 in computing device 240. In this example, configuration information of components 244 as attributes 242 may include configuration of a networking component in components 244. This configuration information may include, for example, configuration of a network in which the computing device is connected. Configuration information of components 244 as attributes 242 may also include version information of components 244 in computing device 240 and any other suitable information describing the configuration of components 244 in computing device 240 in message management system 200. For example, configuration information of sessions 246 as attributes 242 may include a description of sessions 246. In this example, the description of a session that sends and receives messages using computing device 240 may include a type of the session and a protocol used to communicate messages in the session. Also in this example, the type of the session may include text messages, email messages, voice messages, video messages, and any other suitable type of session in message management system 200. Further in this example, a protocol used to communication messages in the session may be any suitable combination of protocols used to exchange messages with components 244 in computing device 240 in message management system 200.

In these illustrative examples, attributes 242 of computing device 240 may also include information about location 226. For example, the information about location 226 attributes 242 may include a description of a physical location in a room where computing device 240 is located and a description of facilities available where computing device 240 is located. In this example, the description of facilities available where computing device 240 is located may include electrical power, lighting, handicapped access, an ability to view other portions of the room, and any other suitable facility description used in selecting computing device 240 in message management system 200.

As depicted, components 244 in computing device 240 define software and hardware components associated with computing device 240. Examples of components 244 in computing device 240 include network cards, storage units, display adapters, display devices, audio devices, audio adapters, external connectors used by removable devices, operating systems, application programs, collaboration tools, calendaring tools, messaging tools, user input devices, audio/video recording devices, security devices, and any other suitable components in computing device 240 in message management system 200.

In these illustrative examples, sessions 246 in computing device 240 communicate messages between users at computing device 240. As depicted, sessions 246 are used in text messaging, exchanging email, voice communications, video messages, and any other suitable session in which communications are sent between users in message management system 200. In these illustrative examples, computing device 240 creates, configures, opens, and closes sessions 246 in computing devices 240. Additionally, computing device 240 may secure sessions 246 in computing device 240. For example, an owner or administrator of computing device 240 may set preferences 216 selecting a portion of components 244 used by users 230 in sessions 246. As another example, the owner or administrator of computing device 240 may also set preferences 216 for selecting another portion of components 244 restricted for use by users 230 in sessions 246.

In these illustrative examples, session data 248 is a component in message management system 200. As depicted, session data 248 comprises information 250 about authorizations 252 for sessions 246 in computing devices 238 for communicating messages between users at computing devices 238. As also depicted, session data 248 comprises information 250 about meeting schedules 254. This information may include, for example, schedule 228 in meeting 222 comprising users 230. In these illustrative examples, authorizations 252 and meetings schedules 254 are stored in information 250 to improve performance of a process that routes messages in message management system 200. For example, in response to a modification to meetings 220 and/or user profiles 208 services in message management services 204 may update information 250. In these illustrative examples, authorizations 252 include permissions received by an owner or administrator of computing device 240 which allow one or more uses in users 230 use of computing device 240 when the one or more users are present in one or more meetings in meetings 220.

Message routing 256 is a service included in message management services 204 which manages messages 258 in message management system 200. Message routing 256 may be used in a process identifying messages for user 232 in messages 258. In these illustrative examples messages 258 is an example of messages 120 in FIG. 1. Message routing 256 may also be used in a process filtering messages 258 according to preferences for message routing 218. Message routing 256 may further be used in a process routing messages 258 to computing devices. For example, routing messages 258 to computing device 240 at location 226 when user 232 is present in meeting 222 in message management system 200.

In these illustrative examples, message 260 is an example of a message from sender 262 to recipients 264. As depicted type 266 of message 260 is one or more of text message, email message, voice data, video data, and any other suitable type of messages sent between users in message management system 200. In these illustrative examples, content 268 of message is the information and data being communicated by sender 262 to recipients 264 in message 260. For example, user 232 may be in recipients 264 of message 260. In this example, when user 232 is present in meeting 222 message routing 256 may route message 260 to computing device 240.

The illustration of message management environment 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown message management services 204, may be present within message management system 200. For example, a service in services 128 in FIG. 1 to create computing devices 238 as virtual computing devices in virtual machines in computer system 124 in FIG. 1 may be included in message management system 200.

Figure 3A:
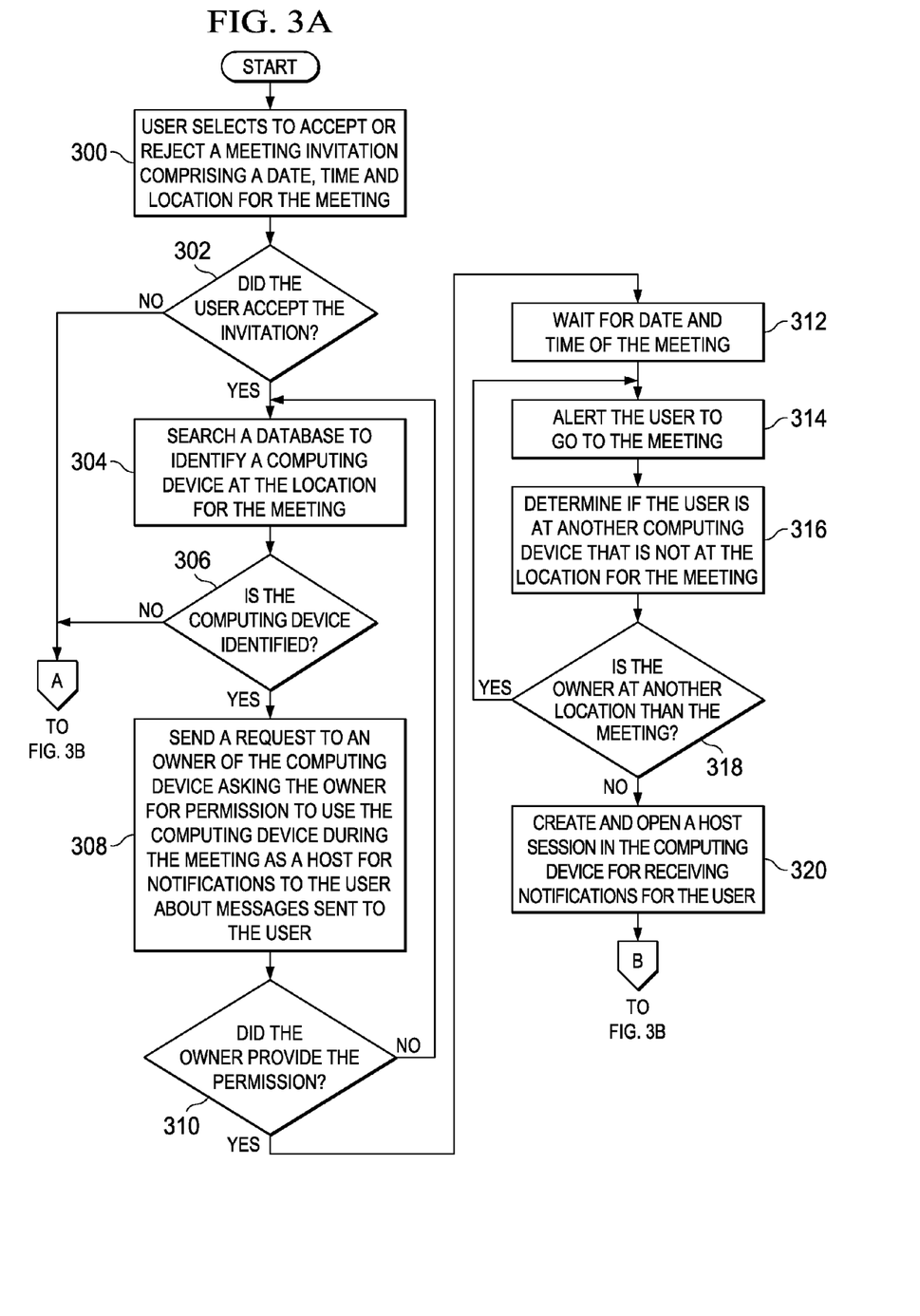
FIGS. 3A and 3B are a flow chart of a process for using presence of a user in calendaring information to forward messages for the user to a workstation at a location for the meeting in accordance with an illustrative embodiment.
Figure 3B:
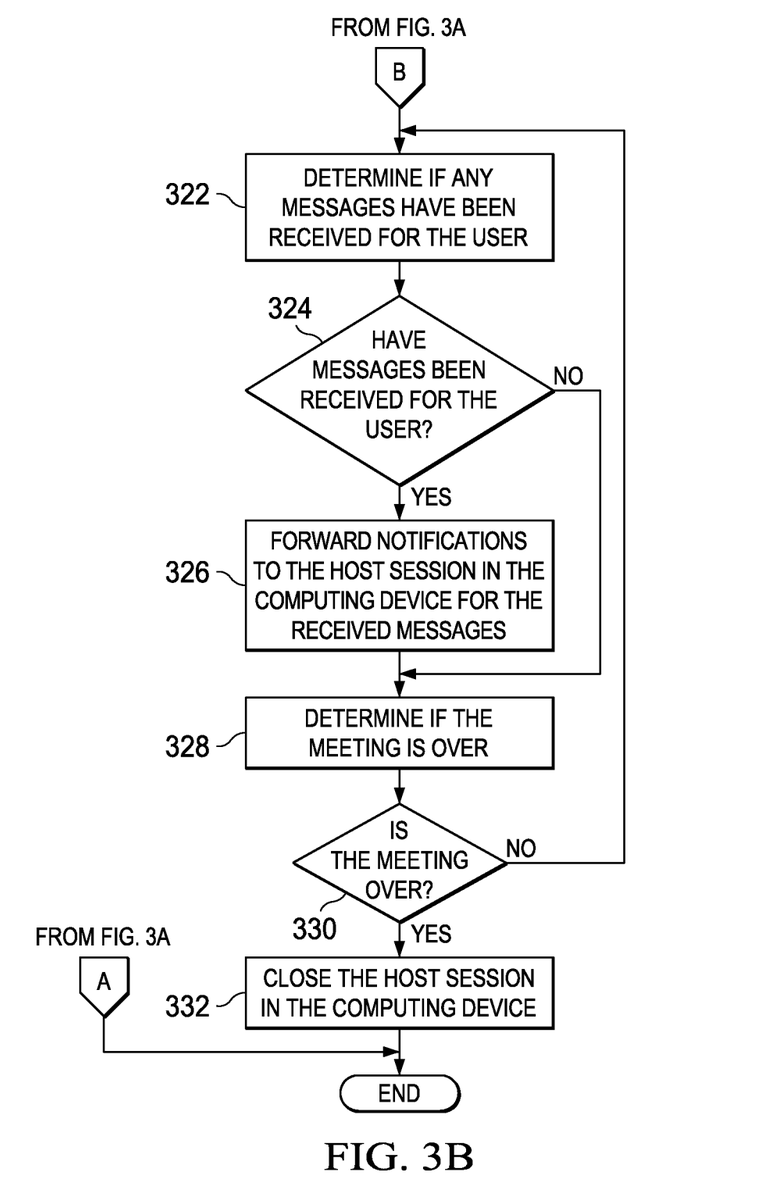

Turning next to FIGS. 3A and 3B, an illustrative example of a flowchart of a process using presence of a user in calendaring information to forward messages for the user to a workstation at a location of the meeting is depicted in accordance with an illustrative embodiment. The steps in FIGS. 3A and 3B may be implemented in message management system 200 in FIG. 2. In particular, the steps in the process may be implemented in software, hardware, or a combination of the two using message management services 204 in data processing system 202 in FIG. 2.

The process begins with a user selecting to accept or reject a meeting invitation comprising a date, a time and a location of the meeting (step 300). In this illustrated process, the recipient is an example of user 232 in FIG. 2 in recipients 264 in FIG. 2. The meeting is an example of meeting 222 in FIG. 2. The date and the time in this illustrated process is an example of schedule 228 in FIG. 2. The location of the meeting in this illustrated process is an example of location 226 in FIG. 2.

The process determines if the user accepted the invitation (step 302). If the user did not accept the invitation the process terminates. If the user accepted the invitation the process continues by searching a database for information about computing devices to identify a computing device at the location of the meeting (step 304). In this illustrated process, the database of information about computing devices is an example of computing devices 238 in FIG. 2 and the computing device is an example of computing device 240 in FIG. 2. For example, the process may identify computing device 240 based on attributes 242 in FIG. 2, components 244 in FIG. 2, and sessions 246 in FIG. 2 matching preferences 212 in FIG. 2 of user 232.

The process next determines if the computing device is identified (step 304). If the computing device has not been identified the process terminates. If the computing device is identified the process continues by sending a request to an owner of the computing device asking the owner for permission to use the computing device during the meeting as a host that receives notifications about messages sent to the user (step 308). The process next determines if the owner provided the permission (step 310). If the user did not provide the permission the process continues at step 304. If the user provided the permission the process waits until the date and time of the meeting (step 312).

Responsive to the process no longer waiting for the date and time of the meeting, the process alerts the user to go to the meeting (step 314). The process next determines if the user is at another computing device that is not at the location of the meeting (step 316). If the user is at another location other than the location of the meeting the process continues goes back to step 314. If the user is not at another location the process continues by creating a session in the computing device as a host session that receives notifications for the user (step 320).

The process next determines if any messages have been received for the user (step 322). If messages have not been received for the user the process skips ahead to step 328. If messages have been received for the user the process continues by forwarding notifications to the host session in the computing device for the received messages (step 326). In this illustrated process, determining whether messages have been received for the user may be performed by searching message repository 116 in FIG. 1.

The process then determines if the meeting is over (step 328). As depicted (step 330), if the meeting is not over the process goes back to step 322. If the meeting is determined to be over the process closes the host session in the computing device (step 332) with the process terminating thereafter.

Figure 4:
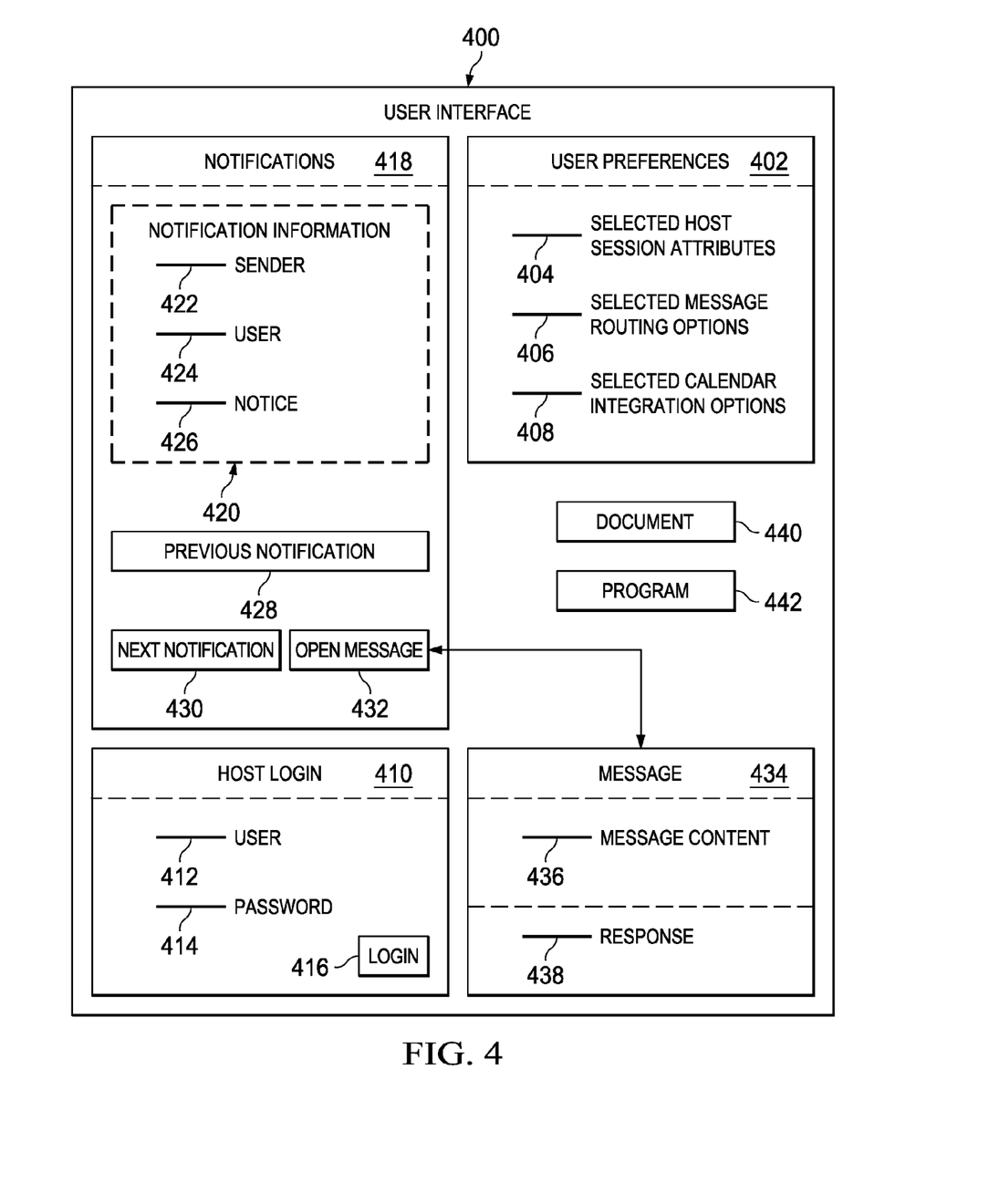
FIG. 4 is an illustration of a user interface for managing messages using message management services in accordance with an illustrative embodiment.

With reference now to FIG. 4, an illustration of a user interface for managing messages using message management services is depicted in accordance with an illustrative embodiment. User interface 400 is an illustrative example of one implementation of a graphical user interface for message management services 204 in FIG. 2 in data processing system 202 in FIG. 2. In other illustrative examples, user interface 400 may also be any type of user interface suitable for presenting the contents of user interface 400 to one or more users.

In this illustrative example, user interface 400 includes user interface windows of services in message management services 204 in FIG. 2. User preferences 402 is a window present in user interface 400 used to enter and modify preferences, such as preferences 212 in FIG. 2. As depicted, the window of user preferences 402 includes selected host session attributes 404, selected message routing options 406, and selected calendar integration options 408. Selected host session attributes 404 is an example of host sessions 216 in FIG. 2. Selected message routing options 406 is an example of message routing 218 in FIG. 2. Selected calendar integration options 408 is an example of calendar integration 214 in FIG. 2.

Host login 410 is a window present in user interface 400 used to log into computing device 240 in FIG. 2. As depicted, the window of host login 410 comprises user 412 and password 414 used to enter a user name and a password. Login 410 is a button in host login 410 to initiate a process that logs into computing device 240.

Notifications 418 is a window present in user interface 400 that displays notifications to users present at a location in a meeting. In this illustrative example, notifications 418 is a user interface displaying messages 258 in FIG. 2. As depicted, the window of notifications 418 includes notification information 420 comprising sender 422, user 424, and notice 426. In this illustrative example, sender is an example of sender 262 in FIG. 2. In this illustrative example, user 424 is an example of user 232 in FIG. 2 that is a recipient in recipients 264 in FIG. 2. In this illustrative example, notice 426 may be example of content 268 in FIG. 2. Notice may also be a portion of message 260 in FIG. 2. This notice may include, for example, a message title, a first sentence of content 268, a first portion of content 268, and any other portion of message 260 in FIG. 2 suitable for a notification for message for user 232 in message management system 200 in FIG. 2.

As depicted, previous notification 428 and next notification 430 are buttons that execute a process that browses messages 258. For example, responsive to a selection of previous notification 428, the process retrieves and displays a previous message to the message shown in notification information 420. As further depicted, open message 432 is a button that opens message 434 as a window present in user interface 400 which displays message content 436. As depicted, the window for message 434 also has a field that receives response 438 from a user. For example, response 438 may be a message from user 424 to sender 422 as a response to message content 436. In this example, responsive to response 438 message management services 204 in FIG. 2 may subsequently use computing device 240 to send the message response 438 to sender 422.

In these illustrative examples, user interface 400 may include additional components used by a user of user interface 400. As depicted, document 440 and program 442 are examples of components 244 in FIG. 2. In this illustrative example, document 440 and program 442 are identified in preferences 212 of an owner of computing device 240 as components in components 244 for which user 232 has permission to access.

Figure 5:
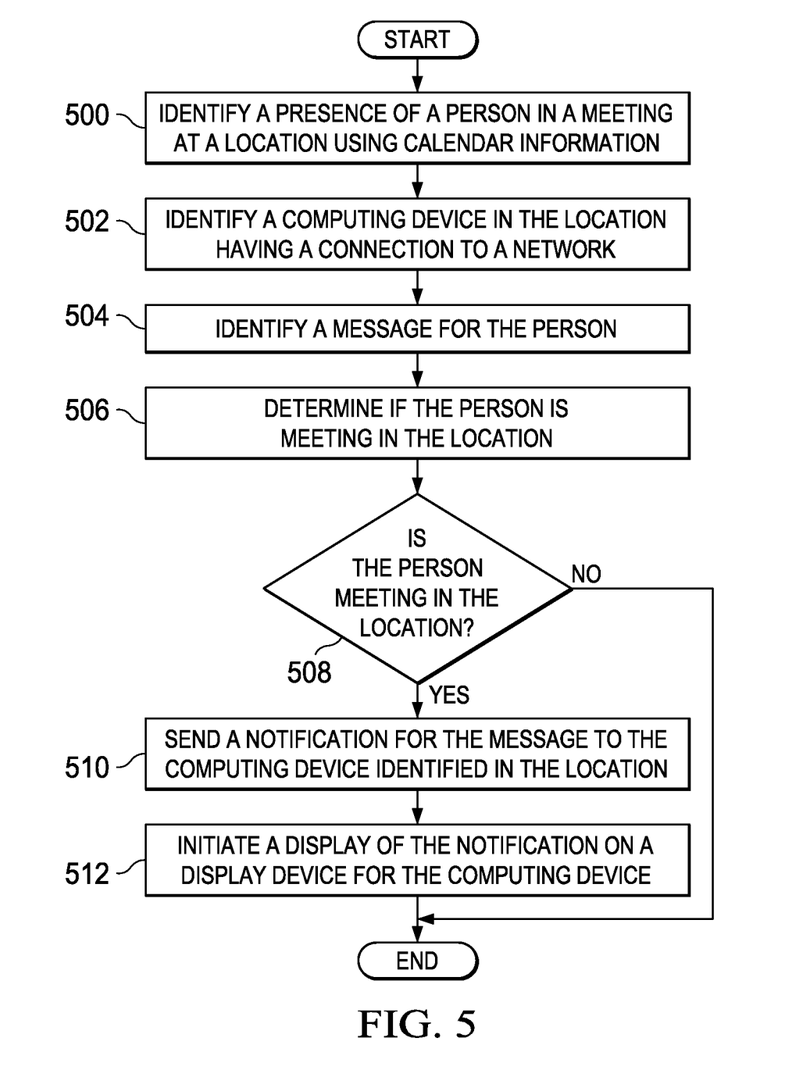
FIG. 5 is a flow chart of a process for sending notifications for messages for a user, to a computing device identified in a location as having a connection to a network, when the user is determined to be present in the meeting based on calendar information in accordance in accordance with an illustrative embodiment.

Turning next to FIG. 5, an illustrative example of a flowchart of a process for sending notifications for messages for a user, to a computing device identified in a location as having a connection to a network, when the user is determined to be present in the meeting based on calendar information in accordance with an illustrative embodiment. The steps in FIG. 5 may be implemented in may be implemented in message management system 200 in FIG. 2. In particular, the steps in the process may be implemented in software, hardware, or a combination of the two using message management services 204 in data processing system 202 in FIG. 2.

The process begins by identifying a presence of a person in a meeting at a location using calendar information (step 500). In this illustrated process, the person is an example of user 232 in FIG. 2, the meeting is an example of meeting 222 in FIG. 2, and the location is an example of location 226 in FIG. 2.

The process next identifies a computing device in the location having a connection to a network (step 502). The process further identifies a message for the person (step 504). Responsive to identifying the message, the process next determines if the person is meeting in the location (step 506). As depicted (step 508), the process terminates if the process determines the person is not meeting in the location. If the process determines the person is meeting in the location, the process continues by sending a notification for the message to the computing device identified in the location (step 510). The process then initiates a display of the notification on a display device for the computing device (step 512) with the process terminating thereafter.

Figure 6:
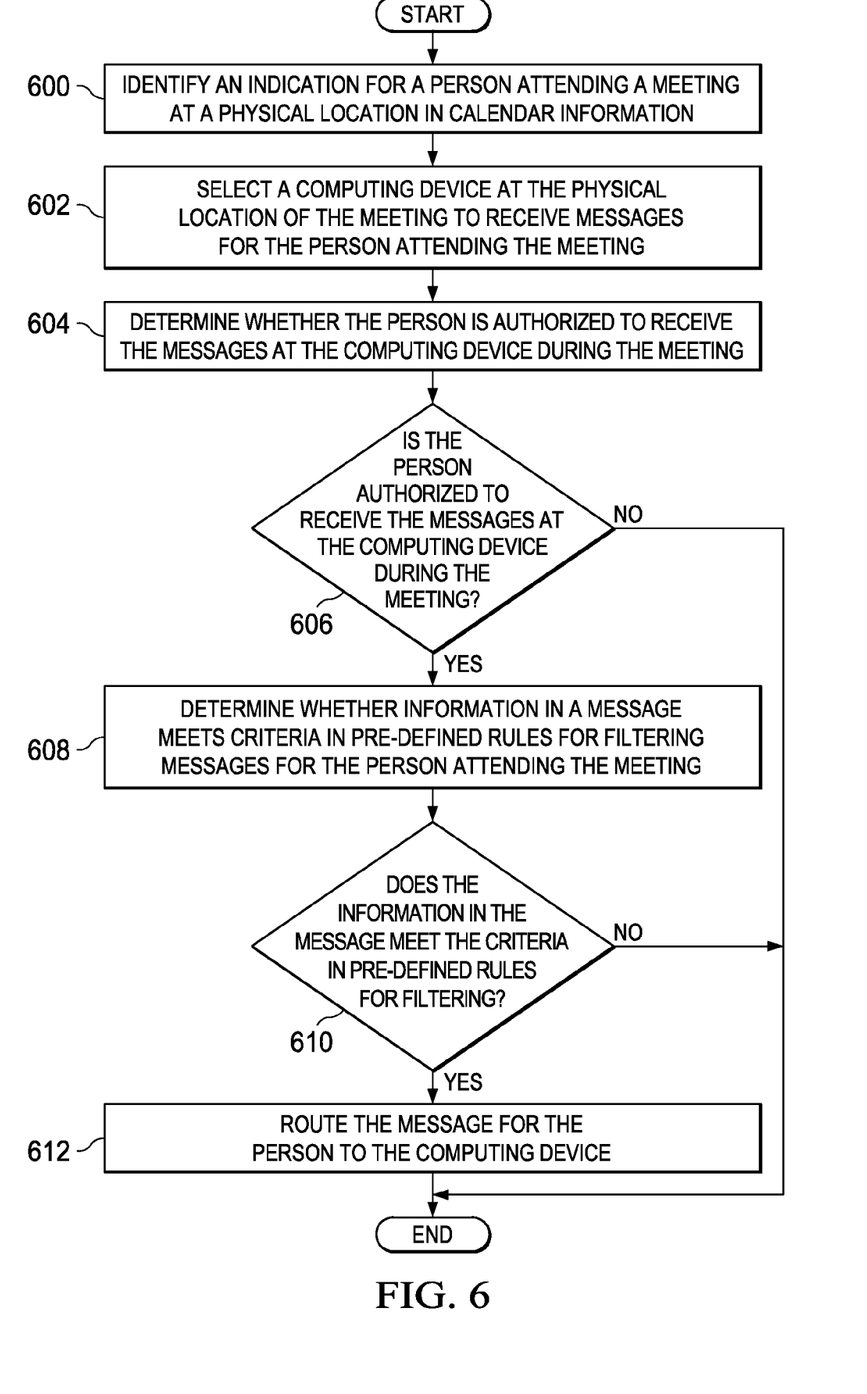
FIG. 6 is a flow chart of a process for routing messages for a person attending a meeting, to a computing device selected for receiving messages for the person attending the meeting, when the user is determined to be authorized and the message meets certain criteria in accordance with an illustrative embodiment.

Turning next to FIG. 6, an illustrative example of a flowchart of a process for routing messages for a person attending a meeting, to a computing device selected for receiving messages for the person attending the meeting, when the user is determined to be authorized and the message meets certain criteria is depicted in accordance with an illustrative embodiment. The steps in FIG. 6 may be implemented in message management system 200 in FIG. 2. In particular, the steps in the process may be implemented in software, hardware, or a combination of the two using message management services 204 in data processing system 202 in FIG. 2.

The process begins by identifying an indication for a person attending a meeting at a physical location in calendar information (step 600). In this illustrated process, the person is an example of user 232 in FIG. 2, the meeting is an example of meeting 222 in FIG. 2, and the location is an example of location 226 in FIG. 2.

The process next selects a computing device at the physical location of the meeting to receive messages for the person attending the meeting (step 602). The process further determines whether the person is authorized to receive the messages at the computing device during the meeting (step 604). As depicted (step 606), the process terminates responsive to the person not being authorized. As also depicted (step 606), if the person is authorized to receive the messages at the computing device during the meeting, the process continues by determining whether information in a message meets criteria in pre-defined rules for filtering messages for the person attending the meeting (step 608).

As depicted (step 610), the process terminates when the message does not meet the criteria. If the process determines the information in the message meets the criteria in pre-defined rules for filtering, the process continues by routing the message for the person to the computing device (step 612) with the process terminating thereafter.

Figure 7:
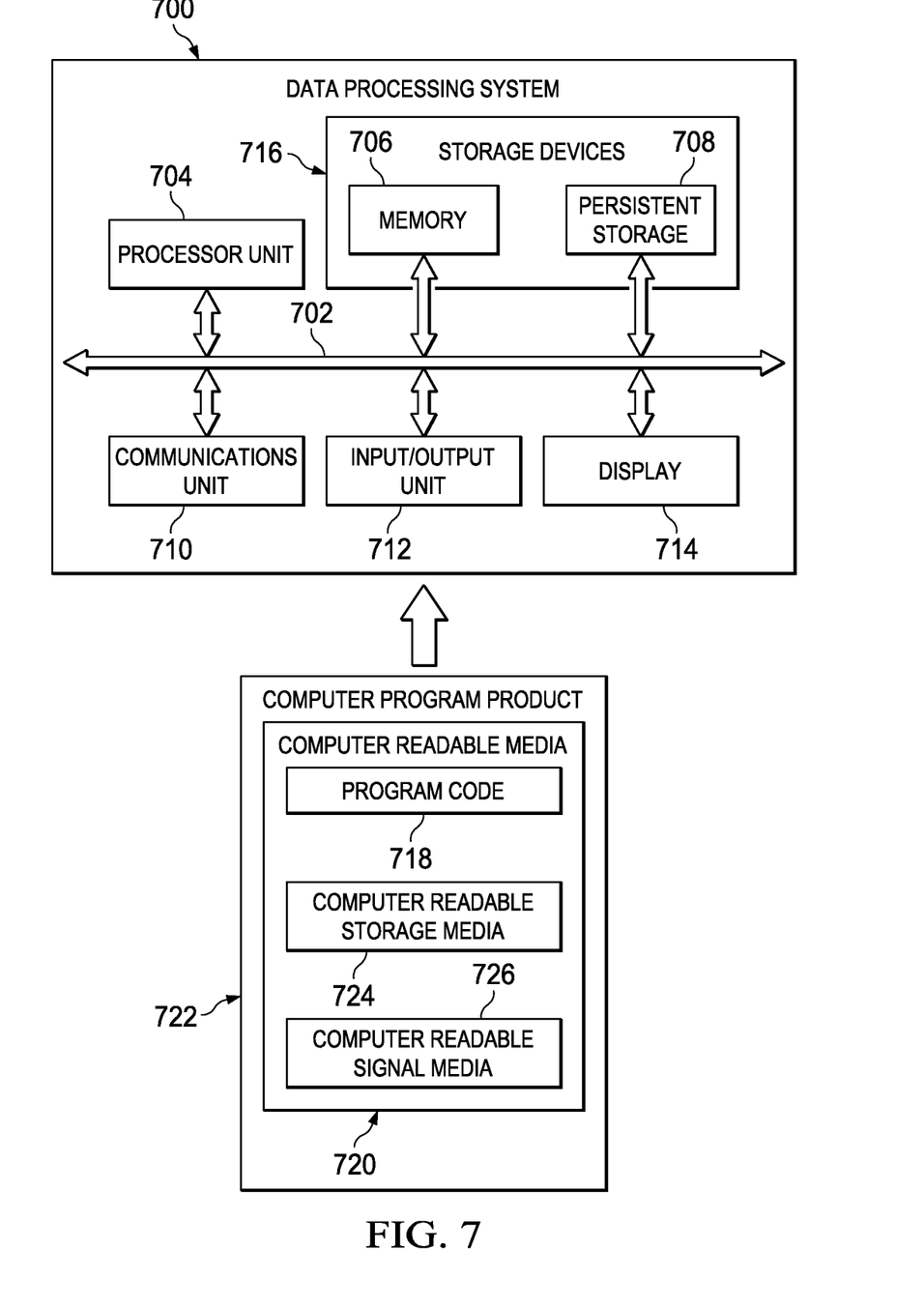
FIG. 7 is an illustration of a data processing system in accordance with an illustrative embodiment.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement managing messages in a data processing environment.

This data processing system is an example of a computer which may be used to implement components of FIG. 1. The components of FIG. 1 include message management system 110, computer system 124, vendor 116, calendar database 114, message repository 116, and computing devices 102. The components of FIG. 1 are components in which hardware, computer usable code, or a combination of the two implementing the processes for the embodiments may be located.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

An operating system may run on processor unit 704 and may also coordinate and provide control of various components within the data processing system of FIG. 7. As a client, the operating system may be a commercially available operating system such as Microsoft® Windows® (Microsoft and Windows are trademarks of Microsoft Corporation in the United States, other countries, or both). As a server, the data processing system of FIG. 7 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both).

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for managing messages. The invention solves the problem of getting messages or notifications for messages to users when they are in a meeting by identifying a computing device at the location where a meeting is taking place and routing the messages or notifications to the identified computing device.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing messages, the method comprising:
    identifying, by a data processing system, a presence of a person in a meeting at a meeting location using calendar information;
    identifying, by the data processing system, a device location of a computing device having a connection to a network; and
    sending, by the data processing system, a notification to the computing device when a message for the person is identified and the meeting location matches the device location of the computing device, wherein prior to the data processing system sending the notification to the computing device, the data processing system creates a session in the computing device to receive the notification for the person when the person is attending the meeting, wherein the session is restricted to only use portions of the computing device selected by the pre-determined authority for the computing device.

2. The method of claim 1, wherein the notification indicates a message is present for the person.

3. The method of claim 1, wherein the notification is the message.

4. The method of claim 1, further comprising:
    initiating, by the data processing system, a display of the notification on a display device for the computing device.

5. The method of claim 1 wherein the computing device is one of one or more computing devices, wherein each computing device in the one or more computing devices having one or more attributes, wherein having the connection to the network is one attribute of the computing device, and wherein identifying, by the data processing system, the computing device in the location having the connection to the network further comprises:
    identifying the computing device based on pre-defined criteria to select the computing device from the one or more computing devices using the attributes of each of the one or more computing devices.

6. The method of claim 5, wherein the pre-defined criteria to select the computing device from the one or more computing devices using the attributes of each of the one or more computing devices comprises one or more preferences selected by the person for selecting a particular computing device, selecting a type of device for the computing device, selecting the computing device based on availability of particular software in the computing device, and selecting the computing device based on selected attributes of the location where the computing device is located.

7. The method of claim 1, wherein identifying, by the data processing system, the device location of the computing device further comprises:
    generating, by the data processing system, a request for permission for the person to receive the notification for the message at the computing device during the meeting;
    sending, by the data processing system, the generated request for permission to a pre-determined authority for the computing device; and
    determining, by the data processing system, whether the person is authorized to receive the notification for the message at the computing device during the meeting based on receiving from the pre-determined authority for the computing device an authorization for the person to receive the notification for the message at the computing device during the meeting.

8. The method of claim 1 wherein the presence of the person in the meeting at the meeting location identified using the calendar information comprises an acceptance of a meeting invitation selected by the attendee, as an agreement by the attendee to physically attend the meeting.

9. The method of claim 1, wherein the calendar information also identifies the physical location of the meeting and a particular time of day and duration of the meeting.

10. The method of claim 1, wherein the message is one or more of text messages, email messages, voice messages, and video messages.

11. A computer comprising:
a processor unit and a computer readable storage device connected to a bus; and
program code for managing messages, wherein the program code is stored on the computer readable storage device and is configured to be run by the processor unit to identify a presence of a person in a meeting at a meeting location using calendar information; identify a device location of a computing device having a connection to a network; and send a notification to the computing device when a message for the person is identified and the meeting location matches the device location of the computing device, wherein prior to sending the notification to the computing device, a session is created in the computing device to receive the notification for the person when the person is attending the meeting, wherein the session is restricted to only use portions of the computing device selected by the pre-determined authority for the computing device.

12. The computer of claim 11 wherein the notification indicates a message is present for the person, and wherein the program code stored on the computer readable storage device is further configured to be run by the processor unit to initiate a display of the notification on a display device for the computing device.

13. A computer program product for managing messages, the computer program product comprising:
a non-transitory computer readable storage medium;
first program code for identifying a presence of a person in a meeting at a meeting location using calendar information;
second program code for identifying a device location of a computing device having a connection to a network;
third program code for sending a notification to the computing device when a message for the person is identified and the meeting location matches the device location of the computing device; and
fourth program code for creating, prior to sending the notification to the computing device, a session in the computing device to receive the notification for the person when the person is attending the meeting, wherein the session is restricted to only use portions of the computing device selected by the pre-determined authority for the computing device, wherein the first program code, the second program code, the third program code, and the fourth program code are stored on the computer readable storage medium.

14. The computer program product of claim 13, wherein the computing device comprises a plurality of programs and wherein one program in the computing device running on the computing device causes another program to be downloaded to the computing device, the downloaded program configured to host a session restricted to only use portions of the computing device selected by a pre-determined authority for the computing device.

15. The computer program product of claim 13, wherein the computer readable storage medium is in a data processing system, and the program code is downloaded over a network from a remote data processing system to the computer readable storage medium in the data processing system.

16. The computer program product of claim 15, wherein the computer readable storage medium is a first computer readable storage medium, wherein the first computer readable storage medium is in a server data processing system, and wherein the program code is downloaded over the network to the remote data processing system for use in a second computer readable storage medium in the remote data processing system.

17. A method for managing messages, the method comprising:
identifying, by a computer system, an indication for a person attending a meeting at a physical location in calendar information;
selecting, by the computer system, a computing device at the physical location of the meeting to receive messages for the person attending the meeting;
determining, by the computer system, whether the person is authorized to receive the messages at the computing device during the meeting; and
responsive to a determination that the person is authorized to receive the messages at the computing device during the meeting, the computer system routing the messages for the person to the computing device for the duration of the meeting, wherein prior to routing the messages for the person to the computing device, the computer system creates a session in the computing device to receive the messages for the person when the person is attending the meeting, wherein the session is restricted to only use portions of the computing device selected by the pre-determined authority for the computing device.

18. The method of claim 1, further comprising:
determining, by the computer system, whether information in the messages meets criteria in pre-defined rules for filtering the messages for the person attending the meeting; and
wherein the computer system routing the messages for the person to the computing device for the duration of the meeting is further responsive to a determination that the information in the messages meets the criteria in pre-defined rules for filtering.

* * * * *